United States Patent [19]

Eisenberg

[11] 4,208,721
[45] Jun. 17, 1980

[54] FAST-ρ θ RANDOM ACCESS MEMORY DEVICE

[75] Inventor: Robert M. Eisenberg, Woodbine, Md.

[73] Assignee: The Singer Company, Binghamton, N.Y.

[21] Appl. No.: 943,435

[22] Filed: Sep. 18, 1978

[51] Int. Cl.² ............................................. G01S 7/44
[52] U.S. Cl. ................................. 364/731; 343/5 SC
[58] Field of Search ................. 364/730, 731, 815; 343/5 SC

[56] References Cited

U.S. PATENT DOCUMENTS

| 3,761,928 | 9/1973 | Greutman | 343/5 SC X |
| 4,002,827 | 1/1977 | Nevin et al. | 364/815 X |
| 4,106,021 | 8/1978 | Katagi | 364/731 X |

Primary Examiner—Jerry Smith
Attorney, Agent, or Firm—Ronald Riechman; Jeff Rothenberg

[57] ABSTRACT

This invention comprises a system that may be utilized in a simulated radar and/or sonar system to convert polar coordinate range and bearing radar and/or sonar scans into X, Y coordinate radar and/or sonar scans. Information regarding the geographic area that is being simulated is entered into this invention and the output of this invention is an X, Y scan conversion that represents the intensity of matter that is going to be written on displays.

3 Claims, 3 Drawing Figures

FAST-$\rho$ $\theta$ RANDOM ACCESS MEMORY DEVICE

BACKGROUND OF THE INVENTION

1. Field of the Invention

This invention relates to electronic circuits, and more particularly to devices for electronically controlling display devices to realistically simulate certain navigational equipment such as Radar and Sonar.

2. Description of the Prior Art

The increased traffic in the air and on the sea has caused an increase in the number of air and marine collisions. In addition to the loss of life and human hardships, property losses have been great. Reasons for such collisions are many and complex, but one of the most important of these is the lack of proper use of radar and sonar systems.

Radar and sonar systems produce signals which have the capability of penetrating fog, darkness, rain, haze, and locating objects which are a great distance from the source that generated the signals. Radar detection of an object is achieved by transmitting a beam of radio-frequency (rf) energy and detecting the energy reflected by the object. A small part of the rf energy is reflected by the object back to a sensor located near the transmitter. Radar ranging is accomplished by timing the period required for the rf energy to make the round trip from the detected object to the transmitter. The distance to the detected object is equal to one-half the time elapsed for the rf energy to make the round trip times the velocity of the rf energy. Sonar detection is similar to radar detection; however, acoustic radiation is the energy radiated rather than rf.

Modern airplane and ship navigation techniques depend on the use of radar and sonar systems. Thus, training in their use is essential for safe and efficient airplane and ship operations.

Man has invented simulators and other training devices to teach students how to use and operate various types of equipment without undergoing the dangers that are inherent in the equipment's actual operation. It is a great deal safer for an air traffic controller to learn how to control the landing and take-off patterns of aircraft in a simulator on the ground that at an actual radar display in the control tower.

One method used in the prior art to simulate radar and sonar displays was to utilize a digital computer for the supplying of information that would be outputted to a plurality of displays. The computer must have sufficient computational speed in order to perform all of the necessary computations that must be performed during a sweep of display and the computer's memory must be sufficiently large to contain all of the information regarding the geographical area that is being simulated. Information pertaining to the simulated geographic area is entered into a computer in X, Y (rectangular coordinate) format and stored in the computer's memory in the form of a table. It is often convenient to enter geographic information in the computer memory in rectangular coordinates, since this is the manner in which geographic information is usually given, i.e., in latitude and longitude. However, the geographic information displayed on the CRT display, using a Plan Position Indicator format sweep, is in polar coordinates. Therefore, it becomes necessary for the computer to convert the geographic information from rectangular to polar coordinates. The table also holds the results of the computer's conversions of the X. Y formatted data into $\rho$ (rho), $\theta$ (theta) formatted data. The expression for the conversion of the X position data is $\rho \sin\theta$, and the expression for the conversion of the Y position data is $\rho \cos\theta$. In the aforementioned expressions, rho represents the range and theta represents the bearing. This conversion must constantly take place as the antenna pointing vector moves around or sweeps the display.

The computer must process the X, Y data and convert it into a rho, theta format. The information had to be range ordered, i.e., put in the proper sequential order for a particular bearing of the antenna at a given instant in time. Then the information would be outputted to external hardware buffers as range ordered data for that particular antenna position. The buffer's contents were compared to the instantaneous range sweep and when coincidence occurred, the buffers contents were fed to the CRT and displayed on a CRT in a Plan Position Indicator format. This procedure was very time consuming and required the computer to expend a great deal of time to process the information. The scan conversion can also be performed by a cathode ray tube with an electrostatic charge plane where the phosphor of a common viewing type CRT is generally placed. The CRT beam is thus writing in one format and then reading in another format.

In order to produce a realistic display, the appearance of the geographic area must change as the simulated vehicle moves. This geographical information must be continually updated by the computer as time elapses and the updating must take into consideration the speed and heading of the vehicle, the prevailing sea currents, the prevailing winds and movements of other vehicles, etc. From the newly computed information, video signals are generated to produce the proper information on the CRT displays.

SUMMARY OF THE INVENTION

This invention overcomes the disadvantages of the prior art by providing a system for performing $\rho$, $\theta$ radar and sonar scans into X, Y scan conversions in a short period of time. Information pertaining to the simulated geographic area is entered into the computer in X, Y (rectangular coordinate) format and stored in a computer memory in the form of a table. With the passage of time during the $\rho$, $\theta$ radar and sonar scans the computer outputs the data to a external X, Y memory in an X, Y format. The data is examined as the vehicle is somewhere within the geographical area being simulated; since the vehicle only has a certain maximum range, the computer only outputs a certain block of data. This block of data contains all of the geographical information in an area around the vehicle that is specified by the maximum range of the simulated radar or sonar system plus a bounding area that will be equivalent to the distance that the vehicle can travel between the time interval of the external buffer updates. The amount of X, Y data that the computer transfers to external storage is always known (a block of data). There are no computations to be performed by the computer since the apparatus of this invention can simulate radar and sonar devices by only receiving X, Y position data.

It is an object of this invention to provide a new and improved system for simulating radar and sonar systems.

It is another object of this invention to provide a new and improved system for updating CRT's.

It is a further object of this invention to provide a new and improved system that converts $\rho$, $\theta$ data to an X, Y format.

Other objects and advantages of this invention will become apparent as the following description proceeds, which description should be considered together with the accompanying drawings.

DETAILED DESCRIPTION OF A PREFERRED EMBODIMENT

Figure 1:
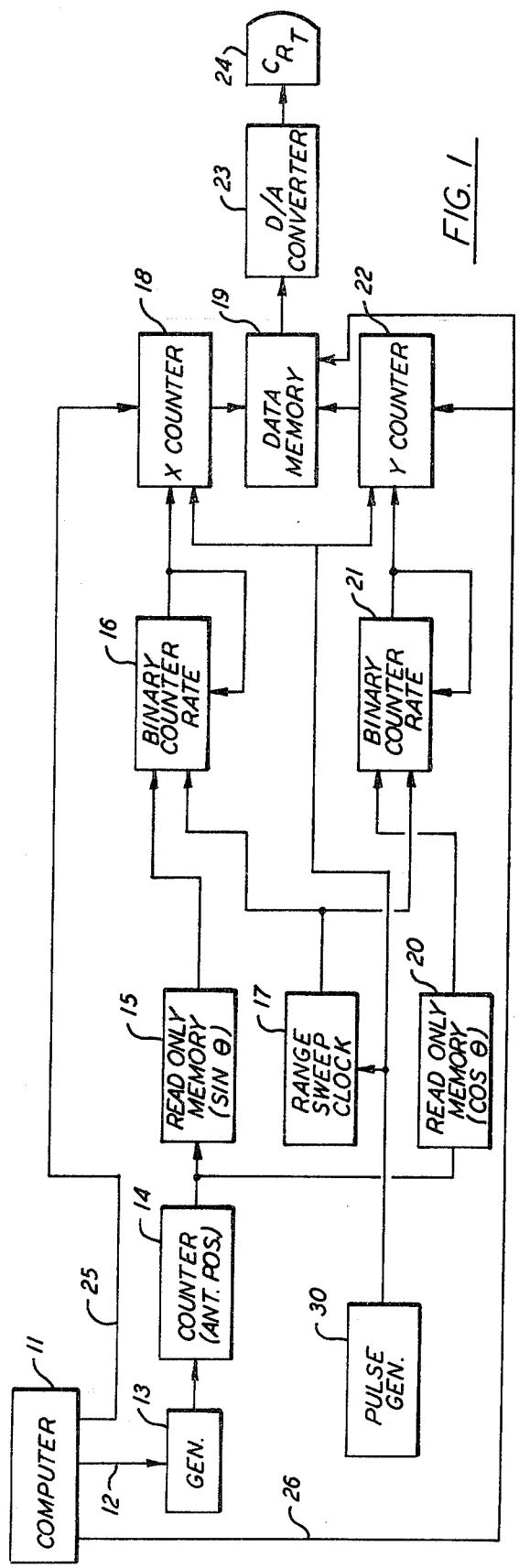
FIG. 1 is a block diagram of the electrical system that comprises this invention.

Referring now to the drawings in detail and more particularly to FIG. 1, the reference character 11 designates a digital computer that produces an antenna rotation rate signal that is transmitted via line 12 to the input of pulse generator 13. The frequency of the antenna rotation rate signal determines the scan rate of the simulated beam. Pulse Generator 13 produces a pulse train output signal that is proportional to its input signal. The time spacing between the pulses of the signal produced by generator 13 is the minimum resolution in azimuth of the simulated antenna. Each of the foregoing pulses corresponds to an incremental change in the simulated antenna bearing. The output of generator 13 is coupled to the input of antenna position counter 14. Counter 14 performs an integration function by incrementing each input pulse so that its contents will represent the simulated antenna position or antenna bearing.

The output of counter 14 is supplied as an on address input to read only memories 15 and 20. Memory 15 stores information pertaining to the X coordinates of the antenna position, and memory 20 stores information pertaining to the Y coordinates of the antenna position. The information contained in memories 15 and 20 is arranged in the manner shown by FIG. 2. The arrangement of information in memories 15 and 20 will be hereinafter described. Data stored in memory 15 is equal to the number of X increments corresponding to $\rho$ max $\sin\theta$ as a function of the antenna position $\theta$ which is determined by counter 14 and the data stored in memory 20 is equal to the number of Y increments corresponding to $\rho$ max $\cos\theta$ as a function of the antenna position $\theta$ which is determined by counter 14. The contents of memory 15 for that particular antenna position that corresponds to the signal produced by counter 14 is loaded into Binary rate counter 16, and the contents of memory 20 for that particular antenna position that corresponds to the signal produced by counter 14 is loaded into Binary rate counter 21. Once counters 16 and 21 are loaded with the appropriate bit pattern their contents are counted down out of the respective counters when a signal arrives from range sweep clock 17. The signal produced by clock 17 is a range increment pulse signal that is equal to the simulated range resolution which is the smallest resolvable element of the radar/sonar system. Clock 17 will only output a signal when trigger pulse generator 30 transmits a pulse to clock 17 during the radar or sonar sweep retrace of CRT 24. The contents of Counter 16 is inversely proportional to the ratio of the sine of the values of the antenna angle to the total range count. For example, if the antenna angle is zero, the contents of memory 15 would be a maximum and counter 16 would produce no output pulses. The contents of memory 20 be zero and a pulse would be output by counter 21 for each range clock pulse produced by clock 17. For example, for an antenna angle of 30 degrees, memory 15 will transmit a 2 which equals (1/(sin30 degrees) to counter 16, and counter 16 would produce an output pulse at 0.5 times the rate of the range clock. The contents of memory 20 will be 1/(cos30) degrees=1.15 which will cause counter 21 to produce output pulses at 0.866 the rate of the range clock. The output of counter 16 is coupled to the input of X address counter 18 in order to supply X count pulses to counter 18 and the output of counter 16 is also coupled to the reset input of counter 16. The output of counter 21 is coupled to the input of address counter 22 in order to supply Y count pulses to counter 22 and the output of counter 21 is also coupled to the reset input of counter 21.

Computer 11 transmits the X position coordinate of the radar or sonar set contained in the simulated vehicle via line 25 to one of the inputs of counter 18. The simulated vehicle Y position coordinate on the radar or sonar set is transmitted via line 26 to one of the inputs of counter 22. The contents of counters 18 and 22 will be transmitted to data memory 19 as memory address when counters 18 and 22 receive a signal from generator 30. Memory 19 is loaded from the computer with the simulated information for the simulated area of interest, this produces a digital output signal that represents the intensity of the displays. This signal is coupled to the input of digital to analogue converter 23, where the digital input is converted into an analogue output. A voltage, therefore, appears at the output of D/A converter 23 with an amplitude proportional to the predicted radar or sonar return which is stored in memory 19. Memory 19 is in synchronism with the antenna position determined by counter 14 and range sweep clock 17. The analogue output of converter 23 may be connected to the intensity axis of CRT 24 or to an analogue computer before being connected to CRT 24 so that certain other effects such as shadowing may be displayed on CRT 24.

Figure 2:
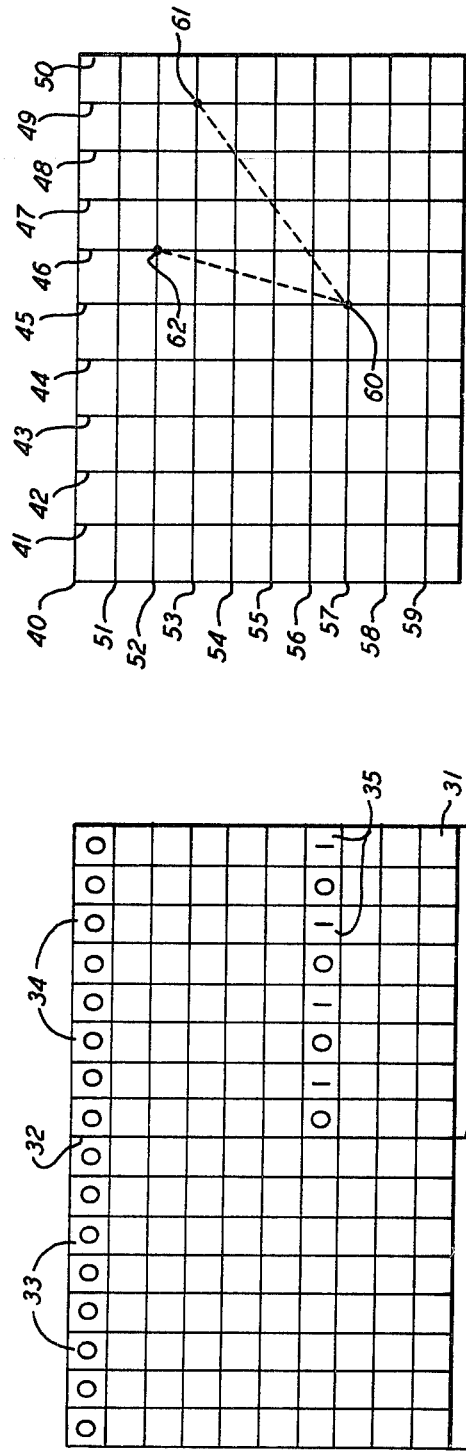
FIG. 2 is a diagram showing the storage of information in memories 15 and 20.

FIG. 2 shows the manner in which information is arranged in the "read only" memories 15 or 20 of FIG. 1. For purposes of explanation it will be assumed that the memory is divided into a plurality of cells 31. Line 32 divides the memory into two equal parts. Address information regarding the angle of the antenna position is written in cells 33, and the value of that particular address is written into cells 34. In "read only" memory 15 for an antenna position of 30 degrees, character 35 represents the binary configuration of the data.

Figure 3:
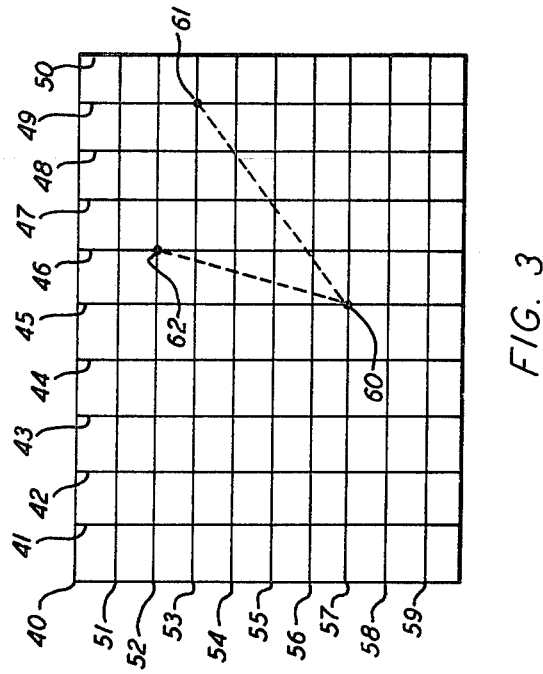
FIG. 3 is a diagram showing the manner in which information is arranged in the data memory 19 of FIG. 1.

FIG. 3 shows the manner in which information is arranged in the radar or sonar data memory 19 of FIG. 1. Memory 19 is arranged in a certain coordinate order in which the origin of the system is represented by character 40. The values of X are represented in increasing numerical order by characters 41, 42, 43, 44, 45, 46, 47, 48, 49, and 50, and the values of Y are represented in increasing numerical order by the characters 51, 52, 53, 54, 55, 56, 57, 58, and 59. It will be assumed at time zero, the origin of the data is at X and Y location indicated by character 60. With the passage of time during the sweep period, both X and Y addresses are incremented in synchronism (within the range resolution capabilities) in the X and Y dimensions. Thus, for example, the X, Y coordinates of the beam may move from point 60 to point 62 for one antenna angle and from 60 to 61 for another greater angle.

The above specification has described a new and improved system for performing X, Y data conversion into rho, theta radar or sonar scan. It is realized that the above description may indicate to those skilled in the art additional ways in which the principles of this invention may be used without departing from its spirit. It is, therefore, intended that this invention be limited only by the scope of the appended claims.

What is claimed is:

1. A system for converting X, Y rectangular coordinate computer stored digital data into polar coordinate range (rho) and bearing (theta) radar and the like scans in simulated display radar and the like display systems; said system comprising of:
   a. a digital computer for generating digital information regarding the antenna rotation rate of the simulated system and the X and Y position coordinates of the simulated vehicle;
   b. a means for determining the present position or bearing of the simulated antenna; the input of said position means being coupled to one of the outputs of said digital computer;
   c. a first read only memory whose input is coupled to the output of said position means; the information stored in said first memory is stored in a plurality of addresses the data contents of each one of said addresses are equal to the number of X increments that correspond to the maximum value of rho times the sin of theta;
   d. a second read only memory whose input is coupled to the output of said position means the information stored in said second memory is stored in a plurality of addresses the data contents of each one of said addresses are equal to the number of Y increments that correspond to the maximum value of rho times the cos of theta;
   e. a first binary counter for determining the change in X position of the simulated antenna, the input of said first counter being coupled to the output of said first memory;
   f. a second binary counter for determining the change in Y position of the simulated antenna, the input of said second counter being coupled to the output of said second memory;
   g. a third counter whose inputs are coupled to the output of said first binary counter and digital computer for determining the present X position of the simulated antenna;
   h. a fourth counter whose input is coupled to the output of said second counter and digital computer for determining the present Y position of the simulated antenna;
   i. a data memory whose input is coupled to the output of said third and fourth counters for storing the X and Y positions of the simulated radar and the like data;
   j. a timing means coupled to said first counter, said second counter, said third counter and said fourth counter for maintaining said system in synchronization whereby upon the completion of a cycle of said timing means the output of said data memory will be a digital signal that represents the intensity of images that are drawn on said displays.

2. The system claimed in claim 1 wherein said position means comprises:
   a. a first pulse generator whose input is coupled to said digital computer and whose output signal is a pulse train that is proportional to the input signal of said pulse generator; and
   b. a fifth counter whose input is coupled to the output of said pulse generator, said fifth counter increments each input pulse that it receives so that its contents will represent the simulated antenna position.

3. The system claimed in claim 1 wherein said timing means comprises:
   a. a second pulse generator that outputs a clock signal that is coupled to the input of said third and fourth counters; and
   b. a range sweep clock whose input is coupled to the output of said second generator and whose output is coupled to the input of said first and second counters, said range sweep clock produces an incremented pulse output signal that is equal to the simulated range resolution.

* * * * *